(12) United States Patent
Kim

(10) Patent No.: US 8,189,218 B2
(45) Date of Patent: May 29, 2012

(54) IMAGE FORMING DEVICE AND PRINTING SYSTEM HAVING SELECTIVE PRINTING FUNCTION OF ADDRESS BOOK AND PRINTING METHOD THEREOF

(75) Inventor: Han-nam Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1004 days.

(21) Appl. No.: 11/489,447

(22) Filed: Jul. 20, 2006

(65) Prior Publication Data
US 2007/0076229 A1    Apr. 5, 2007

(30) Foreign Application Priority Data
Sep. 30, 2005    (KR) .......................... 10-2005-0091761

(51) Int. Cl.
*G06F 3/12* (2006.01)
(52) U.S. Cl. ..................... 358/1.15; 358/1.13; 358/1.18; 358/450
(58) Field of Classification Search .................. 358/1.15
See application file for complete search history.

(56) References Cited

U.S. PATENT DOCUMENTS

| | | | | |
|---|---|---|---|---|
| 5,331,427 | A * | 7/1994 | Namizuka | 382/239 |
| 5,444,828 | A * | 8/1995 | Kataoka | 358/1.18 |
| 5,956,017 | A * | 9/1999 | Ishizawa et al. | 345/156 |
| 6,134,017 | A * | 10/2000 | Schlank et al. | 358/1.15 |
| 6,157,706 | A * | 12/2000 | Rachelson | 379/100.08 |
| 6,559,964 | B1 * | 5/2003 | Tsukamoto et al. | 358/1.15 |
| 6,633,413 | B1 * | 10/2003 | Schlank et al. | 358/468 |
| 7,187,463 | B2 * | 3/2007 | Kagawa | 358/1.15 |
| 2003/0065786 | A1 * | 4/2003 | Park et al. | 709/227 |
| 2003/0179408 | A1 * | 9/2003 | Kagawa | 358/1.18 |
| 2004/0051912 | A1 * | 3/2004 | Schlank et al. | 358/468 |
| 2005/0071520 | A1 * | 3/2005 | Hull et al. | 710/8 |
| 2005/0099650 | A1 * | 5/2005 | Brown et al. | 358/1.15 |
| 2006/0140376 | A1 * | 6/2006 | Yoshioka | 379/210.01 |
| 2006/0156381 | A1 * | 7/2006 | Motoyama | 726/1 |
| 2007/0047007 | A1 * | 3/2007 | Hayashi | 358/401 |
| 2008/0016171 | A1 * | 1/2008 | Shono | 709/206 |

FOREIGN PATENT DOCUMENTS
JP            04-364662        12/1992
(Continued)

OTHER PUBLICATIONS

3725F9103LF3103310L Operating Instructions 2001 (extracted pages).*

(Continued)

*Primary Examiner* — Chan S Park
(74) *Attorney, Agent, or Firm* — Roylance, Abrams, Berdo & Goodman, LLP

(57) ABSTRACT

Provided is an image forming device and a printing system having a selective printing function of an address book and a printing method thereof. The image forming device having a selective printing function of an address book comprising a storage part for storing an address book; a user interface for receiving at least one printing object of the address book; a controller for creating printing data corresponding to the received printing object if the printing object is received through the user interface; and a printing object printing the created printing data. Accordingly, it is possible to selectively print the address book.

14 Claims, 6 Drawing Sheets

FOREIGN PATENT DOCUMENTS

| | | |
|---|---|---|
| JP | 09-294198 | 11/1997 |
| JP | 2004-046901 | 2/2004 |
| KR | 10-1995-0006179 | 6/1995 |
| KR | 1020040003728 | 1/2004 |

OTHER PUBLICATIONS

H556/H557 Facsimile Operating Instructions (Basic and Advanced Features, Copyright 2002, pp. 6, 62, 63, 65 of the Basic Features section and p. 110 of the Advanced Features section) to Ricoh.*

Special edition using Microsoft Office Outlook 2003 (Que Publishing, 2004, pp. 1-2, 231-232, 235, 238-240) to Patricia Cardoza.*

Ricoh, H556 H557 Facsimile Operating Instructions, Copyright 2002 ([BASIC], pp. 1-2, 6 and 55-88 and [AVANCED], pp. 1 and 93-118).*

Cardoza, Special Edition using Microsoft Office Outlook 2003, Que Publishing, Copyright 2004 (pp. 1-2, 187-189, 192, 202, 213-215, 232, 235-240).*

Patricia Cardoza [Special edition using Microsoft Office Outlook 2003, Que Publishing, 2004, pp. 2, 206, 208-209, 229-231, 233, 237-238, 589-590].*

Patrica Cardoza [Special edition using Microsoft Office Outlook 2003, Que Publishing, 2004, Chapter 30].*

* cited by examiner

FIG. 2A

ADDRESS BOOK

| NAME | EMAIL |
|---|---|
| ■ GIL-DONG HONG | Name1@xxx.com |
| ☐ DU-HWAN KIM | Name2@yyy.com |
| ■ SUN-SHIN LEE | Name3@zzz.com |
| ■ JUN HEO | Jamie |
| ■ JOA-JIN KIM | Name5@xxx.com |
| ☐ YUL-GOK LEE | Sajin |

~A

PLEASE SELECT YOUR DESIRED LIST TO PRINT 1 2 3 4 5 6 7 8 9 10 NEXT

| COMPONENT SELECTION | PRINT |

ADDRESS BOOK COMPONENT INFORMATION

- ■ NAME
- ■ EMAIL
- ■ OFFICE TELEPHONE NUMBER
- ☐ ADDRESS
- ☐ DATA OF BIRTH
- ☐ GENDER

PLEASE SELECT COMPONENT TO APPLY IN PRINTING ADDRESS BOOK

CONFIRM

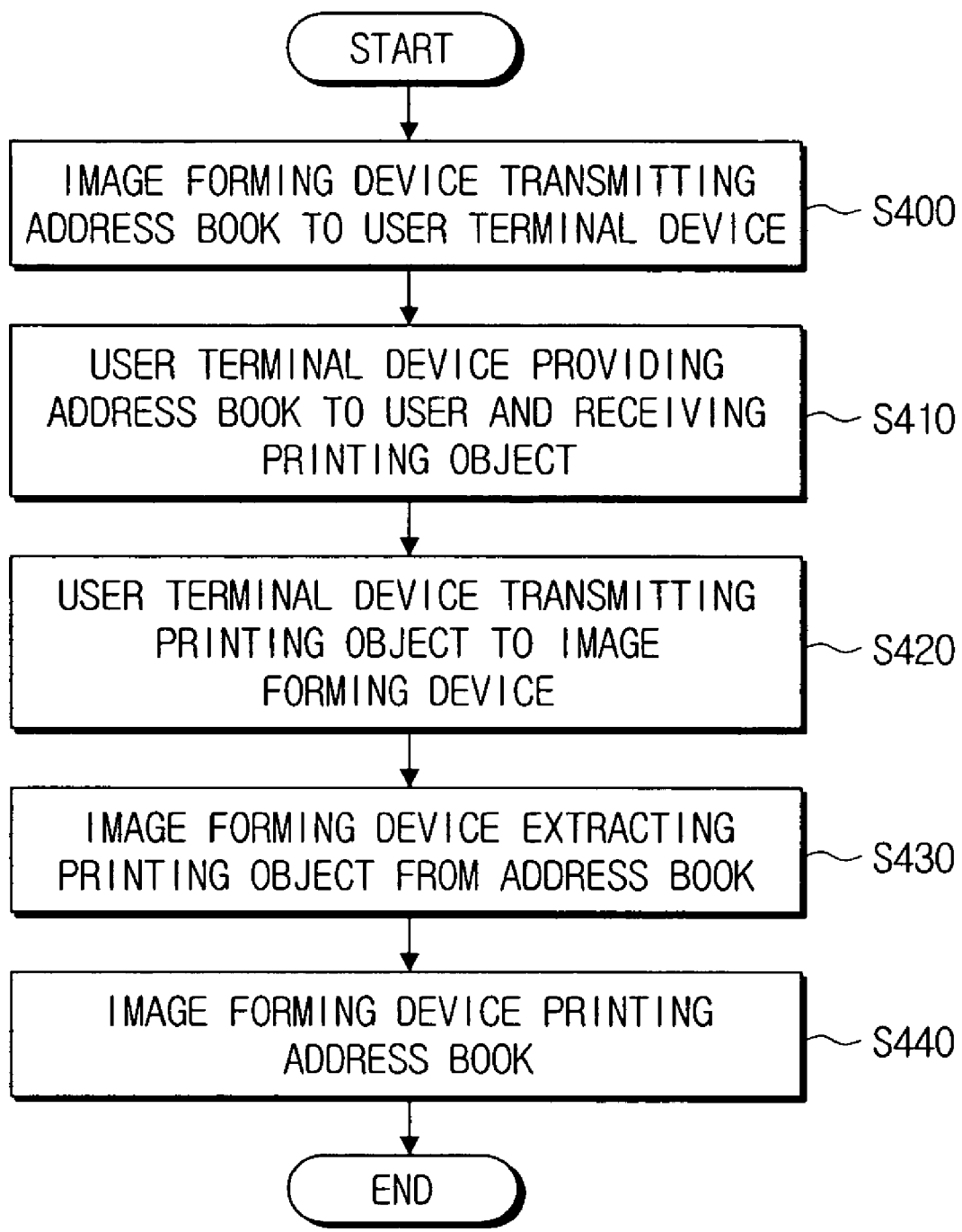

IMAGE FORMING DEVICE AND PRINTING SYSTEM HAVING SELECTIVE PRINTING FUNCTION OF ADDRESS BOOK AND PRINTING METHOD THEREOF

CROSS-REFERENCE TO RELATED APPLICATION

This application claims the benefit under 35 U.S.C. §119(a) of Korean Patent Application No. 2005-91701, filed Sep. 30, 2005, in the Korean Intellectual Property Office, the entire disclosure of which is hereby incorporated by reference.

BACKGROUND OF THE INVENTION

1. Field of the Invention

The present invention relates to an image forming device and a printing system having a selective printing function of an address book and a printing method thereof. More particularly, the present invention relates to an image forming device and a printing system having a selective printing function of an address book and a printing method thereof capable of selectively printing only desired personal information of the address, by use of the image forming device.

2. Description of the Related Art

Developments in digital technologies enable the management of an address book to be more convenient by storing information in a personal computer that used to be handwritten.

Various programs have been developed exclusively for the purpose of managing an address book in order to enhance user convenience. By using such programs, a user can make desired edits to the address book, such as adding newly collected information to the address book or deleting unnecessary information from the address book.

Generally, such programs are used exclusively for managing an address book, and are used to edit the stored address book or print address book information using an image forming device.

When using a conventional address book management program, if a user requests to print the address book, the image forming device sequentially prints all the personal information stored in the address book.

This is not a significant problem when the amount of personal information stored in the address book is small, but it becomes unreasonable to print all the information of the address book when there is the large amount of personal information stored in the address book.

Further, only a part of the personal information in the address book may be needed. Thus, if all the personal information is printed, it is not easy to locate the corresponding desired personal information. Further, printing unnecessary personal information wastes consumables of the image forming device.

Accordingly, there is a need for an improved image forming device and a printing system that has an address book printing function that allows only a desired portion of an address book to be printed.

SUMMARY OF THE INVENTION

Exemplary embodiments of the present invention address at least the above problems and/or disadvantages and provide at least the advantages described below. Accordingly, an aspect of the present invention is to provide an image forming device and a printing system having selective printing function of an address book and a printing method thereof by creating and printing data including only a printing object selected by a user.

In order to achieve the above-described aspects of an exemplary embodiment of the present invention, there is provided an image forming device having a selective printing function of an address book, the device comprises a storage part for storing an address book; a user interface for receiving at least one printing object of the address book; a controller for creating printing data corresponding to the received printing object if the printing object is received through the user interface; and a printing object printing the created printing data.

The user interface may provide a GUI (Graphical User Interface) for displaying an address book used to display the address book to a user and a GUI for printing from the address book for receiving at least one printing object of the address book, respectively.

The user may edit the address book through the GUI displaying the address book, and select the printing object and request to print the selected printing object through the GUI for printing from the address book.

After printing is performed the address book may remain in the same state it was in prior to printing.

Printing objects may include personal information and address book components.

The controller may store the input printing object, separately from the address book stored in the storage part.

A selective printing method of an address book according to an exemplary embodiment of the present invention comprises the steps of providing a user an address book; receiving at least one printing object of the address book from the user; creating printing data corresponding to the received at least one printing object; and printing the created printing data.

In the step of receiving the printing object, the printing object may be personal information and a component to print.

The selective printing method of an address book may further comprise step of storing the received printing object separately from the address book.

A printing system having an selective printing function of an address book according to an exemplary embodiment of the present invention may comprise an image forming device for storing an address book; and a user terminal device receiving the address book from the image forming device and providing the address book to the user, and for receiving at least one printing object of the address book from the user and transmitting the at least one printing object to the image forming device. The image forming device extracts the received at least one printing object received from the address book and prints the received at least one printing object.

The image forming device may comprise a storage part for storing the address book; a terminal device interface for transmitting the address book to the user terminal device and receiving the printing data from the user terminal device; a controller for creating the printing data corresponding to the received printing object; and a printing object for printing the creating printing data.

The user terminal device may comprise: an image forming device interface for receiving the address book from the image forming device; a user interface providing the user the received address book and receiving the at least one printing object of the address book from the user; and a controller for controlling the image forming device interface to transmit the received printing object to the image forming device.

A selective printing method of an address book according to an exemplary embodiment of the present invention comprises steps of: an image forming device transmitting an address book to a user terminal device; a user terminal device providing the address book received to a user; a user terminal device receiving at least one printing object of the address book from the user; a user terminal device transmitting the received printing object to the image forming device; and an image forming device extracting and printing the printing object from the address book.

The selective printing method of an address book may further comprise the step of storing the extracted printing object by the image forming device separately from the address book.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWING FIGURES

The above and other objects, features, and advantages of certain embodiments of the present invention will be more apparent from the following description taken in conjunction with the accompanying drawings, in which:

FIG. 1 is a block diagram of an image forming device having an selective printing function of an address book according to an exemplary embodiment of the present invention;

FIGS. 2A or 2B show a printing object selection screen provided from a user interface part of FIG. 1;

FIG. 5 is another flowchart provided to explain an exemplary embodiment of an selective printing method of an address book.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
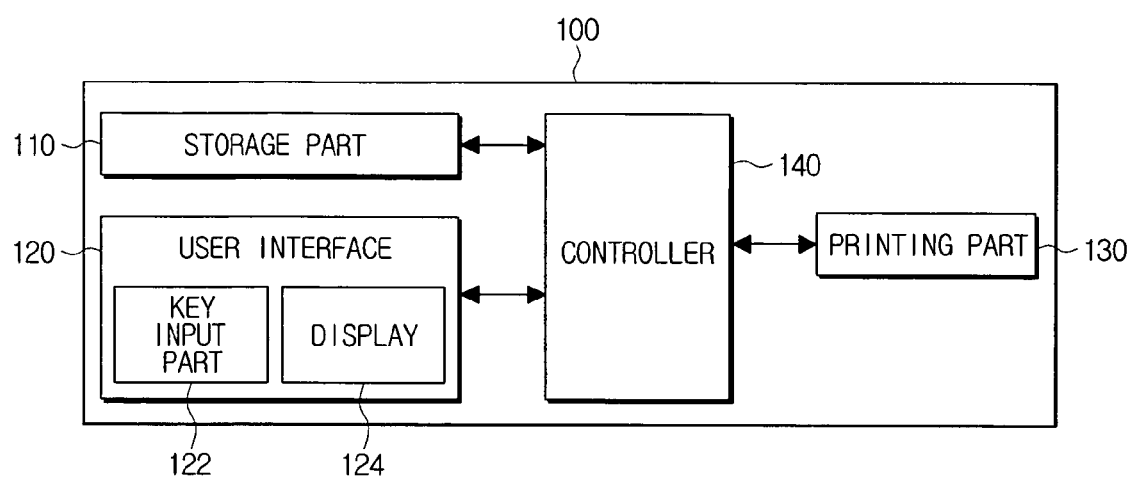

FIG. 1 is a block diagram of an image forming device having a selective printing function of an address book according to an exemplary embodiment of the present invention.

Referring to FIG. 1, the image forming device 100 having a selective printing function of an address book includes a storage part 110, user interface 120, printing part 130, and controller 140.

The storage part 110 stores an address book having a plurality of personal information. A user may change the address book stored at the storage part 110 and the information changed by the user may be stored at any time. The storage part 110 may selectively store printing data created by the controller 140.

The address book stored in the storage part 110 may remain in the same state when printing, regardless of actual printing performance, after the printing is performed by the printing part 130.

The user interface 120 is an interface between the user and the image forming device 100. In an exemplary embodiment of the present invention, the user interface 120 includes a key input part 122 and a display 124. That is, the display 124 of the user interface 120 indicates the address book according to the control of the controller 140, and provides it to the user. The key input part 122 receives at least one printing object of the address book selected by the user.

According to an exemplary embodiment of the present invention, it is exemplified that the key input part 122 and the display 124 are provided with the user interface 120. However, either or both the key input part 122 and the display 124 may be provided elsewhere. For example, when the display 124 includes a touch screen, the display 124 may also function as the key input part 122.

The user interface 120 may provide a GUI (Graphical User Interface) that displays the address book so as to provide the address book to the user. Further, the user interface 120 may provide a GUI for printing from the address book and for receiving at least one printing object of the address book. The GUI displaying the address book is provided with menus for editing the address book including adding, deleting, and changing. The GUI for printing from the address book is provided with menus for selecting at least one printing object of the address book and requesting the printing of the selected printing object. A printing object option screen provided by the user interface 120 will be described with reference to FIGS. 2A through 2B below.

The printing part 130 performs a general printing function. According to an exemplary embodiment of the present invention, the printing part 130 prints the printing data created by the controller 140. The printing data includes only the printing objects of the address book selected by the user through the user interface 120.

The controller 140 controls the overall functions of the image forming device 100. That is, the controller 140 controls signals input and output from the storage part 110, the user interface 120 and the printing part 130.

When receiving a signal, from the user through the key input part 122 of the user interface 120, requesting an address book to be provided, the controller 140 controls the display 124 of the user interface 120 to retrieve the address book stored in the storage part 110 and provides it to the user.

When receiving the printing object from the key input part 122 of the user interface 120, the controller extracts only the printing object of the address book stored in the storage part 110 that is selected by the user and creates the printing data. The controller controls the printing part 130 to print the created printing data.

The controller 140 stores personal information corresponding to the printing object selected by the user, separately from the address book in the storage part 110. The personal information may be a new form of the address book that includes only personal information frequently used by the user.

FIGS. 2A and 2B show a printing object selection screen provided by the user interface of FIG. 1.

The user interface 120 provides the GUI displaying the address book so as to provide the user with the address book and the GUI for printing from the address book for receiving the printing object of the address book from the user.

The GUI displaying the address book includes a menu (not shown) for embodying a function, provided by a program, that is exclusively used for managing a general address book. That is, a personal information list is included in the address book for helping the user easily recognize personal information. Further included is a menu for the user to selectively to add, delete and change the personal information of the address book.

The GUI for printing from the address book is exemplified in FIG. 2A. As illustrated, is the personal information list (A) indicated in the address book through the GUI displaying the address book. The user may select the printing object through the personal information list. The user selects the printing object from the personal information list (A) and presses a printing button (C), to print only the desired parts that have been selected.

The GUI for printing from the address book is not able to perform editing of the, address book such as addition, deletion and changing personal information. That is, the editing of the address book is set to be performed by the GUI for displaying the address book. Thereby, change to the address book is prevented due to the user's mistake in the GUI for printing from the address book.

In order to select or change components of the address book, the user may select the component to be printed before starting the printing of the address book. That is, if the user presses a component option button (B), an address book component information screen is provided, as illustrated in FIG. 2B, and the user may select one or more of the components of the address book to print.

According to an exemplary embodiment of the present invention, an address book component list (D) includes a name, e-mail, office telephone number, address, date of birth, and a gender. However, any other component may be used without departing from the spirit and scope of the invention.

By way of example, if the user selects the name, e-mail, and office telephone number on the component information screen of FIG. 2B, the personal information list (A) of FIG. 2A indicates the name, e-mail and telephone number. Then, the name, e-mail and telephone number are printed.

Figure 3:
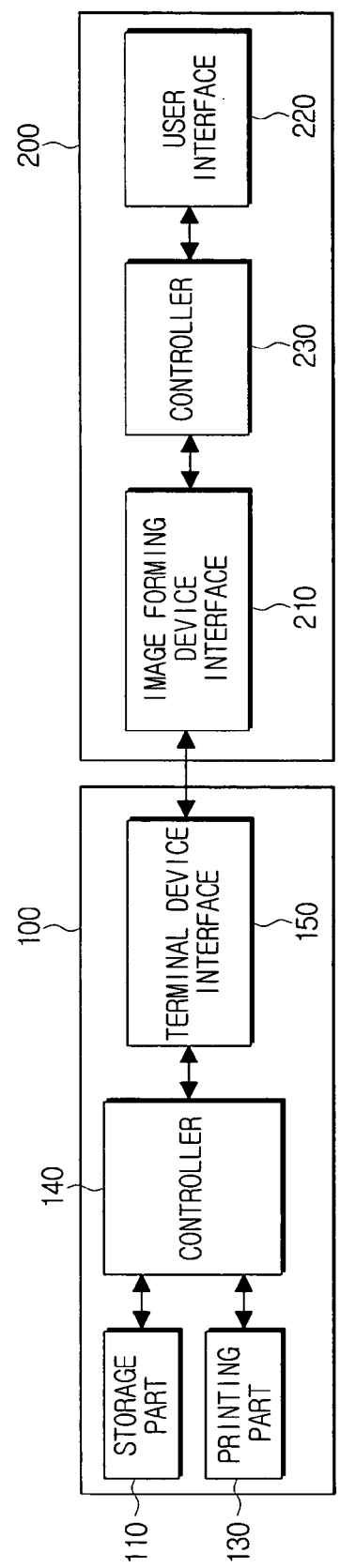
FIG. 3 shows a block diagram of a printing system having a selective printing function of an address book.

FIG. 3 shows a block diagram of a printing system having a selective printing function of an address book.

FIG. 1 shows the address book management at the image forming device 100. FIG. 3 shows the interfacing between the user terminal device 200 and an image forming device 100. The image forming device 100 depicted in FIG. 3 and FIG. 1 are similarly constructed. The reference numbers of FIG. 1 are used for the same structures in FIG. 3 and only differing structures will be described.

Referring to FIG. 3, the image forming device 100 includes the storage part 110, printing part 130, terminal device interface 150, and controller 140. Functions of the storage part 110 and printing part 130 will not be described, because they are the same as in FIG. 1.

The terminal device interface 150 supports an interface between the user terminal device 200 and the image forming device 100. According to an exemplary embodiment of the present invention, the terminal device interface 150 transmits the address book to the user terminal device 200 and receives the printing object selected by the user from the user terminal device 200, under control of the controller 140.

The controller 140, as described in FIG. 1, controls overall functions of the image forming device 100, including a signal input and output among the storage part 110, printing part 130 and terminal device interface 150.

According to the an exemplary embodiment of the present invention, the controller 140 extracts the address book stored at the storage part 110 and transmits to the user of terminal device 200 through the terminal device interface 150.

When receiving the printing object selected by the user through the terminal device interface 150, the controller 140 extracts only the printing object input from the address book stored at the storage part 110, and creates the printing data. The controller 140 controls the printing part 130 to print the created printing data.

The user terminal device 200 includes an image forming device interface 210, user interface 220, and controller 230.

The image forming device interface 210 provides an interface between the image forming device 100 and the user terminal device 200. According to an exemplary embodiment of the present invention, the image forming device interface 210 receives the address book received from the image forming device 100, and transmits the printing object selected by the user to the image forming device 100.

The user interface 220 provides an interface between the user and the user terminal device 200. The user interface 220 of the user terminal device 200 performs the same function as the user interface 120 of the image forming device 100 illustrated in FIG. 1. That is, the user interface 220 provides the address book to the user and receives at least one printing object of the address book from the user, under control of the controller 230.

The controller 230 controls the overall functions of the user terminal device 200. That is, the controller 230 controls signals that are transferred between the image forming device interface 210 and the user interface 220.

When receiving the printing object through the user interface 220, the controller 230 controls the image forming device interface 210 to transmit the received printing object to the image forming device 100.

Figure 4:
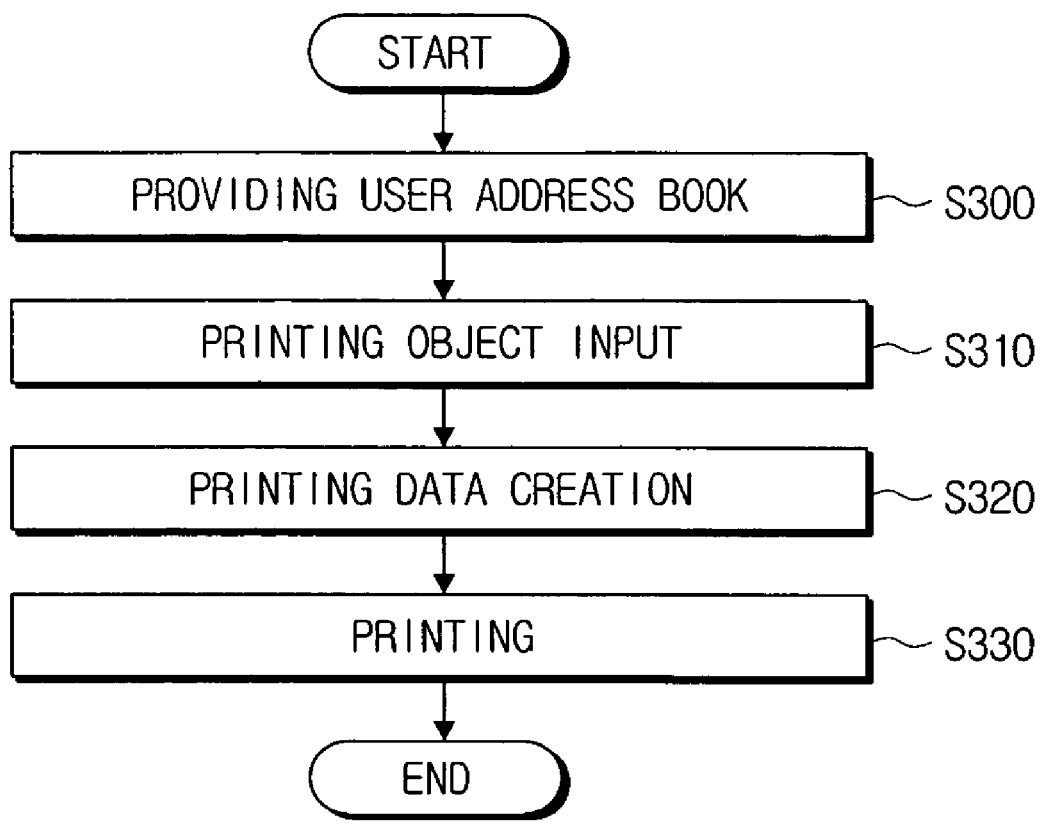
FIG. 4 is a flowchart provided to explain an exemplary embodiment of a selective printing method of an address book.

FIG. 4 is a flowchart provided to explain an exemplary embodiment of a selective printing method of an address book.

Described is a selective printing method of an address book using an image forming device 100 of FIG. 1.

When the user requests the address book from the image forming device 100 through the key input part 122 of the user interface 120, the controller 140 extracts the address book stored in the storage part 110 and controls the display 124 of the user interface 120 to provide it to the user. The GUI displaying the address book or the GUI for printing from the address book is indicated on the display 124 of the user interface 120, in step S300.

The user inputs the printing object through the GUI for printing from the address book of FIG. 2A. The user may select personal information and address book components, in step S310.

When receiving the printing object selected by the user through the key input part 122 of the user interface 120, the controller 140 extracts the printing object from the address book stored at the storage part 110, and creates the printing data including the extracted printing object. Personal information corresponding to the printing object selected by the user may be separate from the address book stored in the storage part 110, in step S320.

The controller 140 controls the printing object to create the printing data with respect to the printing object and print the created printing data. The printing part 130 prints the printing data, in step S330.

FIG. 5 is another flowchart provided to explain an exemplary embodiment of a selective printing method of an address book.

Described is a selective printing method of an address book using a printing system having the image forming device 100 and the user terminal device 200.

The controller 140 of the image forming device 100 extracts the address book from the storage part 10 and transmits the extracted address book to the terminal device 200 through the terminal device interface 150, in step S400.

The user terminal device 200 receives the address book received from the image forming device 100 from the image forming device interface 210. When receiving the address book, the controller 230 of the user terminal device 200 provides the address book received from the user interface 220 to the user and receives the printing object from the user in step S410.

When receiving the printing object selected by the user through the user interface 220, the controller 230 of the user terminal device 200 transmits the printing data received through the image forming device interface 210 to the image forming device 100, in step S420.

When receiving the printing object from the user terminal device 200, the controller 140 of the image forming device 100 extracts only personal information corresponding to the printing data from the address book stored in the storage part 110, and creates the printing data including the personal information corresponding to the extracted printing object in step S430.

The controller 140 of the image forming device 100 controls the printing part 130 to print the created printing data. The printing part 130 prints the printing data created by the controller 140, in step S440.

It is possible to selectively print the address book, by printing the only printing data selected by the user at the image forming device 100 having the storage part 10 storing the address book.

As mentioned above, according to an exemplary embodiment of the present invention, the image forming device and the printing system having a selective printing function of an address book and the printing method thereof, it is possible to provide only the information needed by the user, by printing only the information corresponding to the printing object selected by the user from the address book.

Thereby, time is prevented from being wasted by not printing the entire address book, and consumables associated with the image forming device are not wasted.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image forming device having a selective printing function of an address book comprising:
  a storage part for storing an address book, the address book comprising a plurality of names and a plurality of components for each of the names;
  a user interface for displaying the address book, selecting one or more names of the address book, selecting one or more components for all of the selected name or names, and receiving one or more printing objects corresponding to the one or more selected components;
  a controller for creating printing data corresponding to the one or more printing objects; and
  a printing part for printing the created printing data;
  wherein the one or more printing objects comprise personal information corresponding to the one or more components of the address book.

2. The image forming device having a selective printing function of an address book of claim 1, wherein the user interface provides a GUI (Graphical User Interface) for displaying an address book used to display the address book to a user and a GUI for printing from the address book and for receiving the one or more printing objects of the address book.

3. The image forming device having a selective printing function of an address book of claim 2, wherein the user edits the address book through the GUI displaying the address book.

4. The image forming device having a selective printing function of an address book of claim 2, wherein the user selects the printing object and requests to print the selected printing object through the GUI for printing from the address book.

5. The image forming device having a selective printing function of an address book of claim 1, wherein after printing is performed, the address book is in the same state it was in prior to printing.

6. The image forming device having a selective printing function of an address book of claim 1, wherein the controller stores the input one or more printing objects, separately from the address book in the storage part.

7. A selective printing method of an address book on an image forming apparatus, the selective printing method comprising:
  displaying a pre-registered address book for a user, the pre-registered address book comprising a plurality of names and a plurality of components for each of the names;
  selecting one or more names of the address book;
  selecting one or more components for all of the selected name or names, and receiving one or more printing objects corresponding to the one or more selected components;
  creating printing data corresponding to the received one or more printing objects; and
  printing the created printing data;
  wherein the one or more printing objects comprise personal information corresponding to the one or more components of the address book.

8. The selective printing method of an address book of claim 7, further comprising a step of storing the selected one or more printing objects separately from the address book.

9. The selective printing method of an address book of claim 7, wherein after printing is performed, the address book is in the same state it was in prior to printing.

10. A printing system having a selective printing function of an address book comprising:
  an image forming device for storing an address book, the address book comprising a plurality of names and a plurality of components for each of the names; and
  a user terminal device for receiving the address book from the image forming device and displaying the address book to a user, selecting one or more names of the address book in accordance with the user's selection, selecting one or more components for all of the selected name or names, and receiving one or more printing objects corresponding to the one or more selected components and transmitting the received one or more printing objects to the image forming device;
  wherein the image forming device extracts the received one or more printing objects;
  wherein print data is created from the extracted one or more printing objects; and
  wherein the one or more printing objects comprise personal information corresponding to the one or more components of the address book.

11. The printing system having a selective printing function of an address book of claim 10, wherein the image forming device comprises:
- a storage part for storing the address book;
- a terminal device interface for transmitting the address book to the user terminal device and receiving the one or more printing objects from the user terminal device;
- a controller for creating printing data corresponding to the received one or more printing objects; and
- a printing part for printing the created printing data.

12. The printing system having a selective printing function of an address book of claim 10, wherein the user terminal device comprises:
- an image forming device interface for receiving the address book from the image forming device;
- a user interface displaying the received address book for a user and selecting the one or more printing objects of the address book in accordance with the user's selection; and
- a controller for controlling the image forming device interface to transmit the selected one or more printing objects to the image forming device.

13. A selective printing method of an address book on an image forming system, the selective printing method comprising:
- an image forming device for transmitting the address book to a user terminal device, the address book comprising a plurality of names and a plurality of components for each of the names;
- a user terminal device for displaying the address book, selecting one or more names of the address book, selecting one or more components for all of the selected name or names, receiving one or more selected printing objects corresponding to the one or more selected components, and transmitting the received one or more printing objects; and
- an image forming device for extracting the one or more transmitted printing objects, forming print data from the extracted one or more transmitted printing objects, and printing the print data;
- wherein the one or more printing objects comprise personal information corresponding to the one or more components of the address book.

14. The selective printing method of an address book of claim 13, further comprising a step of storing the extracted one or more printing objects by the image forming device separately from the address book.

\* \* \* \* \*